(12) United States Patent
Murakami et al.

(10) Patent No.: US 6,483,544 B1
(45) Date of Patent: Nov. 19, 2002

(54) IMAGE PROCESSING METHOD AND IMAGE PROCESSING APPARATUS FOR EXECUTING GRADATION CONVERSION OF A PIXEL

(75) Inventors: Keiichi Murakami, Kawasaki (JP); Toshiya Miyazaki, Kawasaki (JP); Yoshiro Beni, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/389,335

(22) Filed: Feb. 14, 1995

(30) Foreign Application Priority Data

Mar. 18, 1994 (JP) .............................. 6-049318

(51) Int. Cl.$^7$ .............................. H04N 5/31; H04N 7/01
(52) U.S. Cl. ...................... 348/441; 348/163; 348/442; 128/661.01
(58) Field of Search ................................ 348/441, 448, 348/452, 458, 607, 616, 625, 604, 163, 442; 382/262, 266, 272, 275; 128/661.01

(56) References Cited

U.S. PATENT DOCUMENTS

| | | | | |
|---|---|---|---|---|
| 4,361,853 A | * | 11/1982 | Remy et al. ................. 358/167 |
| 4,618,887 A | * | 10/1986 | Birk ........................... 358/112 |
| 4,663,665 A | * | 5/1987 | Tanaka et al. ............... 358/140 |
| 4,682,230 A | * | 7/1987 | Perlman et al. .............. 358/167 |
| 4,694,342 A | * | 9/1987 | Klees ......................... 358/167 |
| 4,890,161 A | * | 12/1989 | Kondo ........................ 358/135 |
| 5,224,483 A | * | 7/1993 | Lipschutz .............. 128/662.02 |
| 5,305,204 A | * | 4/1994 | Ohhashi ................ 364/413.13 |
| 5,347,599 A | * | 9/1994 | Yamashita et al. ............. 382/54 |
| 5,409,007 A | * | 4/1995 | Saunders et al. ...... 128/661.01 |
| 5,465,718 A | * | 11/1995 | Hochman et al. ......... 128/653.1 |
| 5,475,420 A | * | 12/1995 | Buchin ......................... 348/72 |
| 5,515,449 A | * | 5/1996 | Tsurnoka et al. ........... 382/128 |
| 5,541,667 A | * | 7/1996 | Saito ........................... 348/616 |
| 5,649,031 A | * | 7/1997 | Nakamura et al. .......... 382/254 |
| 5,751,846 A | * | 5/1998 | Higgins-Luthman et al. .... 382/169 |

FOREIGN PATENT DOCUMENTS

| | | |
|---|---|---|
| JP | 55-56765 | 4/1980 |
| JP | 55-133182 | 10/1980 |
| JP | 60-236580 | 11/1985 |
| JP | 61-26189 | 2/1986 |
| JP | 62-185466 | 8/1987 |
| JP | 1-162991 | 6/1989 |
| JP | 3-24674 | 2/1991 |
| JP | 4-192896 | 7/1992 |

OTHER PUBLICATIONS

Eugine Walach et al, "Quantitative Tissue Characterization Based on Pulsed–Echo Ultrasound Scans" IEEE Tranactions on Biomedical Engineering, vol. BME–33, No. 7, Jul. 1986.

* cited by examiner

Primary Examiner—Victor R. Kostak
(74) Attorney, Agent, or Firm—Staas & Halsey LLP

(57) ABSTRACT

An image processing method for converting the pixel value of a pixel of interest in a displayed image, wherein pixel values of the pixel of interest and pixels surrounding the same are compared with a predetermined threshold value while a conversion characteristic most suitable for the pixel of interest is selected on the basis of the result of comparison indicating the magnitude relationship, and the pixel value of the pixel of interest is changed according to the most suitable conversion characteristic that is selected. The threshold may have different values for different pixels, may have the same value over one scan line, or may be constant for all pixels.

22 Claims, 9 Drawing Sheets

IMAGE PROCESSING METHOD AND IMAGE PROCESSING APPARATUS FOR EXECUTING GRADATION CONVERSION OF A PIXEL

BACKGROUND OF THE INVENTION

1. Field of the Invention

The present invention relates to an image processing method and an image processing apparatus for applying gradation conversion to each pixel of a displayed image, for the purpose of effectively obtaining a clear image free from noise.

2. Description of Related Art

FIG. 1 is a block diagram showing the configuration of an image processing apparatus of the prior art wherein gradation conversion is applied by changing the conversion characteristic ($\gamma$ characteristic) of the pixel value of each pixel in order to make the image clear and easy to recognize. In FIG. 1, numeral 51 denotes a frame memory that stores digital video data. Video data is read from the frame memory 51 and loaded on a look-up table (hereinafter abbreviated as LUT) 52 that is a random access memory as required. The LUT 52 applies gradation conversion to the video data according to the conversion characteristic that is inputted from a characteristic input unit 56, and outputs the converted data to a D/A converter 53. The D/A converter 53 converts the input data to analog signal and outputs it to a CRT 54 that serves as display means. Numeral 55 denotes a timing controller that controls this system.

Operation of the image processing apparatus having such a configuration as described above will now be described below. Pixel value of each pixel is sent from the frame memory 51 successively to the LUT 52 in accordance to address data supplied from the timing controller 55. The LUT 52 receives the data (pixel value) before gradation conversion as address input and outputs the data after gradation conversion to the D/A converter 53 as data corresponding to the address. The data after gradation conversion that is outputted from the LUT 52 is converted to analog video signal by the D/A converter 53 and is inputted to the CRT 54 together with a synchronization signal from the timing controller 55, so that an image that has been made clearer through gradation conversion is displayed on the CRT 54.

Ultrasonic diagnosis techniques to diagnose the conditions of living body by using ultrasonic waves have been widely utilized as methods of diagnosis that do not affect the living body. In the ultrasonic diagnosis, ultrasonic wave emitted from an ultrasonic probe is transmitted into the living body so that reflected waves having different characteristics depending on the difference in the tissue are generated and received by the ultrasonic probe, while the received signal is converted to an electrical signal that is used to display an image on a display device, in order to study the configuration, size, position and other characteristics of the organ from the image.

A typical example of the ultrasonic diagnosis is the tomography of heart (echocardiography). In the ultrasonic diagnosis of heart, because the intracardiac region, pericardial region and myocardial region have reflection characteristics different from each other, signals that are obtained have different levels. Specifically, the signal reflected from the myocardial region has the highest level followed by the signal reflected from the pericardial region and that from the intracardiac region in the decreasing order of the signal level. Therefore, to obtain a clear image that is easier for the observer to recognize in the observation of echocardiography requires it to identify which region is represented by the signal and to apply gradation conversion according to the signal level.

In an image processing apparatus, however, because the characteristic of gradation conversion in the LUT 52 is fixed regardless of the position of the pixel of interest, true noise generated in the intracardiac region that should be eliminated and weak signals from the cardiac wall to be detected are equally suppressed in the ultrasonic image of the heart, for example, thereby making it impossible to obtain necessary images. When it is attempted to detect weak signals that are necessary for diagnosis, on the other hand, sufficient effect of noise suppression cannot be obtained.

SUMMARY OF THE INVENTION

An object of the invention is to provide an image processing method and an image processing apparatus capable of producing images easy to recognize for the observer, by automatically changing the gradation conversion characteristic on the basis of the statistical distribution of the pixel values of a plurality of pixels located in the vicinity of each pixel in the image.

Another object of the invention is to provide an image processing method and an image processing apparatus capable of applying gradation conversion with the optimum conversion characteristic with a hardware configuration of relatively small scale, by processing the statistical distribution of the amplitude relationship between the pixel values of pixels in the vicinity of the pixel of interest and predetermined threshold.

In the image processing method according to the invention, conversion characteristic for the pixel value of a pixel of interest is adaptively changed on the basis of the statistical distribution of M pixel values of the pixel of interest and M−1 pixels that surround the same and including thereof (or the pixel values of M−1 pixels surrounding and not including the pixel of interest). Therefore, because the conversion characteristic for the pixel value of the pixel of interest is automatically changed, most suitable conversion characteristic can be selected for the region on which each pixel is based, thereby making it possible to produce images easier for the observer to recognize.

For the statistical distribution used as the criterion of changing the conversion characteristic, the result of comparing the magnitude relationship between the pixel values and the predetermined threshold is employed. Thus automatic operation can be easily achieved with a hardware configuration smaller in size compared to the case of using histogram as the statistical distribution, and realtime operation is also made possible.

Such an arrangement is employed as the M pixels including the pixel of interest and M−1 pixels surrounding the same are located in a rectangular area in the image, and that statistical distribution of the M pixels included in the rectangular area is processed. Consequently, the region where the pixel of interest exists can be more easily identified.

When the same threshold value is used for pixels on one scan line in the rectangular area, a plurality of pixel values on the same scan line can be compared with the threshold by means of a single comparator, and therefore the apparatus can be made more compact by reducing the number of comparators.

Also when the same threshold value is used for all pixels located in the rectangular area, all pixel values can be compared with the threshold by means of one comparator, and therefore the apparatus can be made furthermore compact by reducing the number of comparators.

Further, when comparing the pixel values with the threshold, a comparator of simpler configuration can be used to make it possible to simplify the apparatus, by comparing only several most significant bits.

Furthermore, by using a look-up table when changing the conversion characteristic for the pixel of interest, speed of the changing operation can be increased.

The above and further objects and features of the invention will more fully be apparent from the following detailed description with accompanying drawings.

DESCRIPTION OF THE PREFERRED EMBODIMENTS

First, operating principle of the invention will be described below. Description that follows deals with a case when the gradation conversion characteristic for the pixel of interest is changed based on statistical distribution of pixel values of M pixels including the pixel of interest. Operation in the case of changing the gradation conversion characteristic for the pixel of interest based on the statistical distribution of the pixel values of M−1 pixels excluding the pixel of interest is approximately the same as that described above, and therefore description thereof is omitted here. In the description that follows, echocardiography image used in ultrasonic diagnosis will be taken as an example. Statistical distribution of pixel values will be described taking histogram as an example. A method of recognizing a region in an image by using a histogram of pixel values (luminance) in ultrasonic diagnosis is disclosed, for example, in "Quantitative Tissue Characterization Based on Pulsed-Echo Ultrasound Scans" (IEEE TRANSACTIONS ON BIO-MEDICAL ENGINEERING. VOL. BME-33, NO. 7 JULY 1986).

Figure 1:
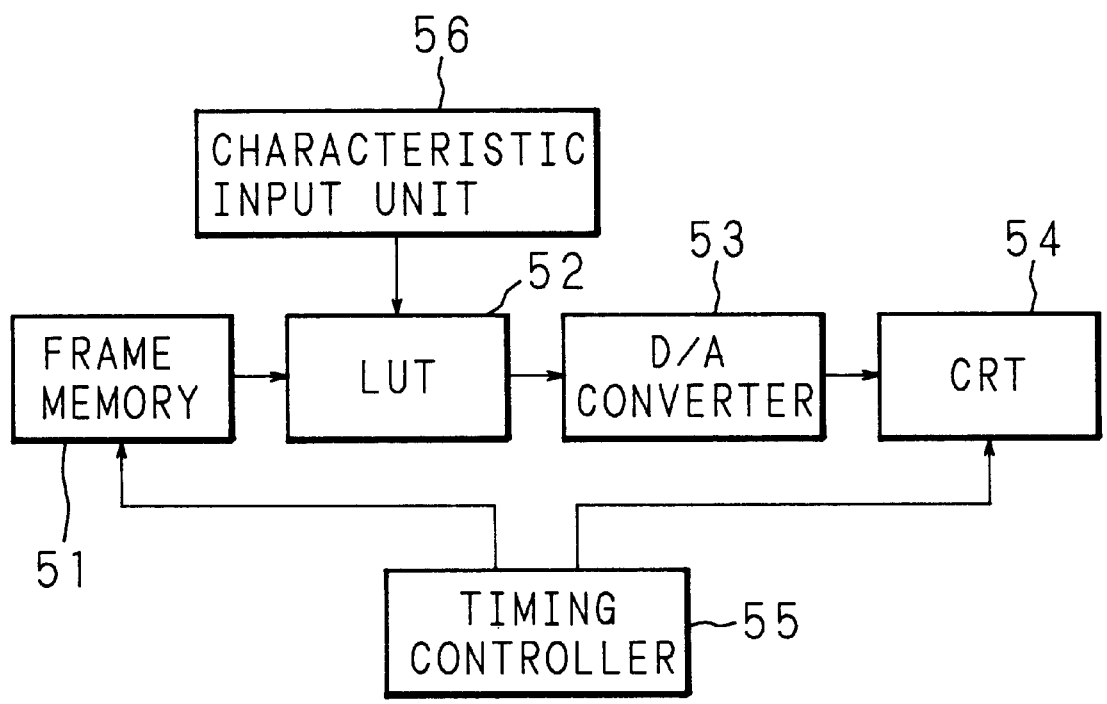
FIG. 1 is a configuration diagram of the image processing apparatus of the prior art.
Figure 2:
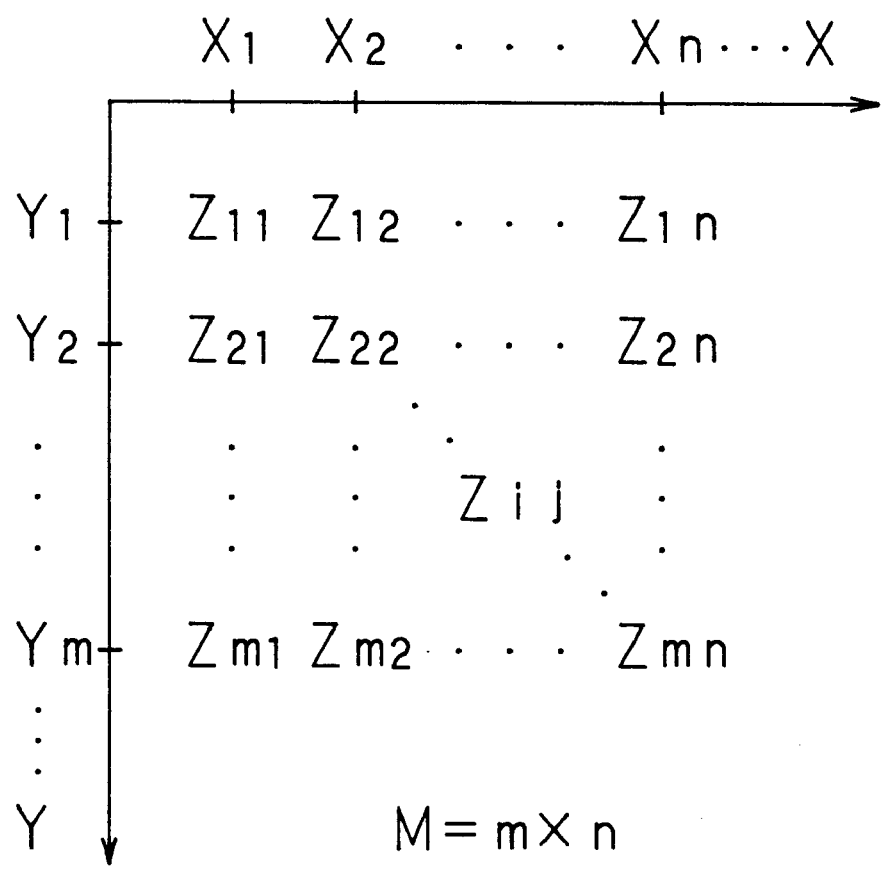
FIG. 2 is a schematic diagram showing the pixel arrangement in an image in the image processing method of the invention.
Figure 3A:
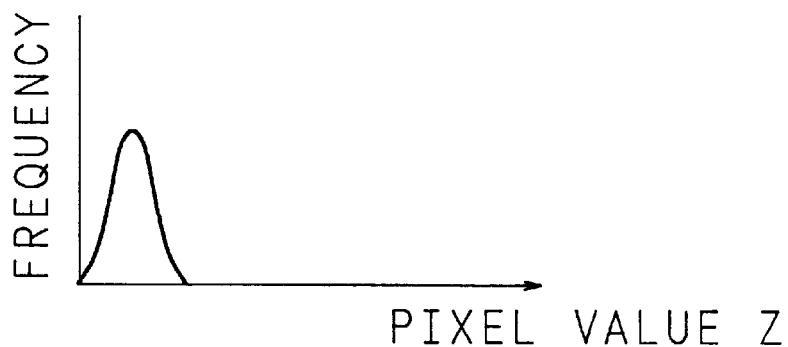
FIGS. 3A, 3B and 3C are histograms of pixel values in the image processing method of the invention.
Figure 4A:
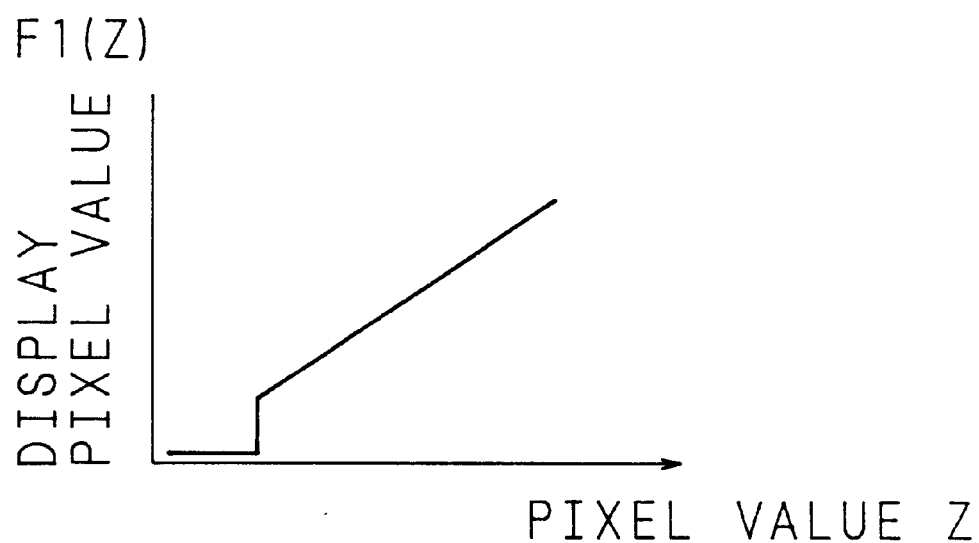
FIGS. 4A and 4B are graphs showing the gradation conversion characteristic in the image processing method of the invention.

FIG. 2 is a schematic diagram showing the arrangement of pixels in an image. In FIG. 2, X and Y represent the horizontal and vertical coordinates of the image, respectively, and $Z_{ij}$ represents the pixel value of a pixel located at position $(X_i, Y_j)$. Now with attention given to a pixel located at position $(X_i, Y_j)$ and assuming that histogram shown in FIG. 3A is obtained for M pixel values of this pixel and M−1 pixels surrounding the same. In this case, because the area consisting of the M pixels is presumed to be an area where signal level is sufficiently low, namely the intracardiac region, the gradation conversion characteristic F1(Z) shown in FIG. 4A is used to determine the display pixel value $F1(Z_{ij})$ for the initial pixel value $Z_{ij}$. The gradation conversion characteristic shown in FIG. 4A is a characteristic of linearly converting only a part of input data not less than a predetermined level while regarding a part of input data less than the predetermined level as noise and discarding it. Such a characteristic is effective in reducing the noise of low level existing in the intracardiac region (portion that should be displayed black).

Figure 3B:
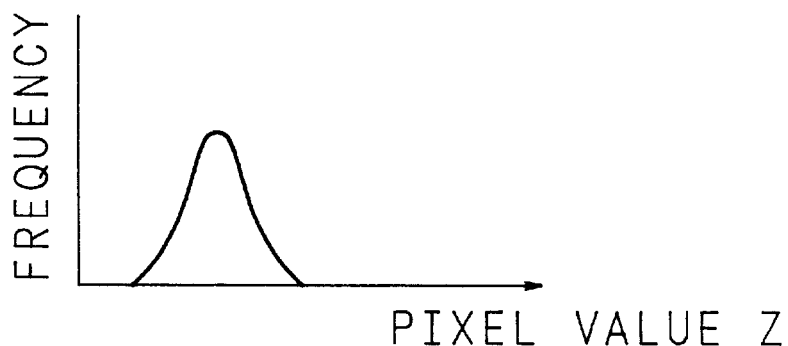
Figure 4B:
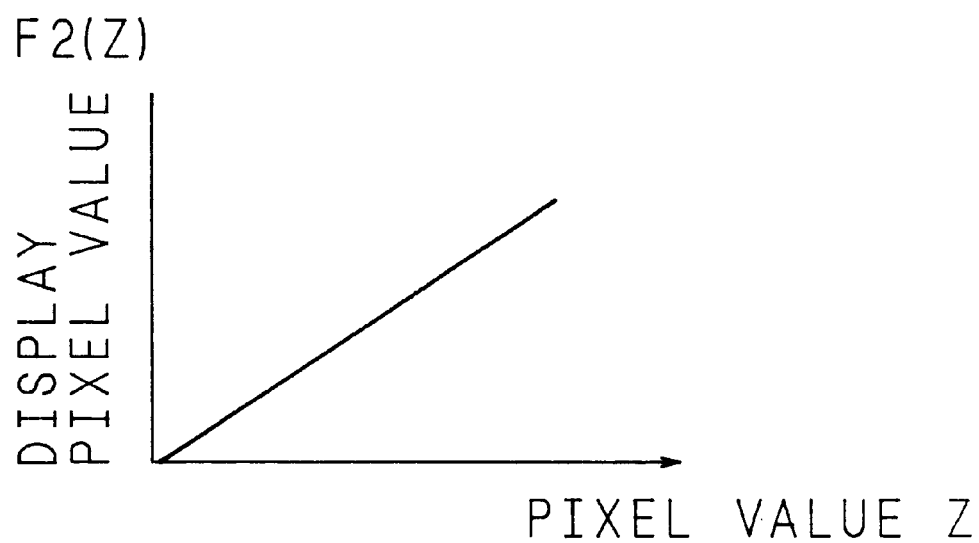

Assume that a histogram shown in FIG. 3B is obtained in an operation similar to the above with attention given to another pixel. In this case, because the area consisting of the M pixels has low signal level but is presumed not the intracardiac region but the pericardial region, gradation conversion characteristic F2(Z) shown in FIG. 4B is used to determine the display pixel value $F2(Z_{st})$ for the initial pixel value $Z_{st}$. The gradation conversion characteristic shown in FIG. 4B is a characteristic of linearly converting without discarding the low level signals (including noise). Such a characteristic is effective in detecting weak signals existing in the pericardial region and myocardial region when observing the heart, for example, by means of an ultrasonic diagnosis apparatus.

Figure 3C:
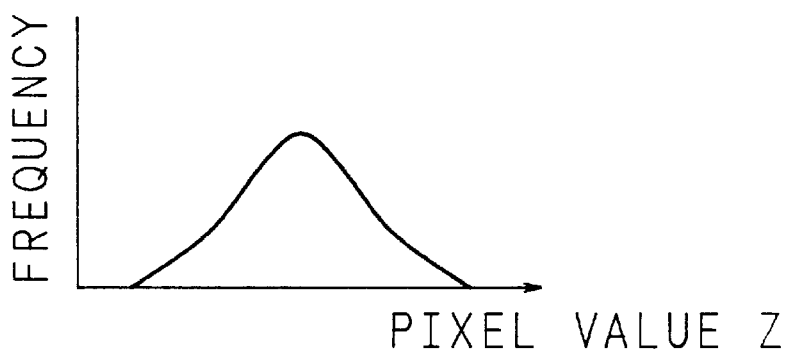

Also assume that a histogram shown in FIG. 3C is obtained in an operation similar to the above with attention given to further another pixel. In this case, because the area consisting of the M pixels is an area of sufficiently high signal level, namely the myocardial region, gradation conversion characteristic F2(Z) shown in FIG. 4B is used to determine the display pixel value $F2(Z_{uv})$ for the initial pixel value $Z_{uv}$, similarly to the case of the pericardial region.

Because the reflection characteristic for the ultrasonic wave is different from tissue to tissue even in the same organ, as described above, to obtain a clear ultrasonic image that is easy to recognize requires it to identify which region is being observed and to set the gradation conversion characteristic according to the region. According to the invention, as described above, because the gradation conversion characteristic for the pixel of interest is automatically changed on the basis of the statistical distribution of the pixel values of the pixels in the vicinity of the pixel of interest, the gradation conversion characteristic is automatically changed according to the conditions of the surrounding area thereby making it possible to carry out gradation conversion suited to a particular region and to obtain images that are easy to recognize, even in cases when the distribution of pixel values changes with the area in the image.

Meanwhile there is a problem that it takes a long time to generate a histogram. When this problem is solved by speeding up the process of generating the histogram, there remains such a problem that the hardware becomes larger in size and expensive.

In order to solve these problems, result of comparing the magnitudes of the pixel values with predetermined threshold is used for the statistical distribution as the criterion of changing the gradation conversion characteristic. When such an arrangement is employed, hardware configuration can be made more compact than in the case of using histogram for the statistical distribution.

When pixels located in a rectangular area of an image are processed to determine the statistical distribution thereof, identification of the area can be done more easily. When such a configuration as pixel values on the same scan line are compared with the threshold by means of one comparator is employed on the assumption that the pixel values on the same scan line have the same value of threshold, or when such a configuration as all pixel values are compared with the threshold in one comparator is employed on the assumption that all pixels have the same threshold, the apparatus can be made more compact. Also when the pixel values are compared with the threshold by comparing several most significant bits only, configuration of the comparator can be simplified. Also when a look-up table is used when changing the conversion characteristic for the pixel of interest, quick output of the changed pixel value can be obtained.

Now the invention will be described in detail with reference to the accompanying drawings showing the preferred embodiments. The first embodiment of such a configuration as one comparator is prepared to correspond to each pixel in the area of interest while the pixel value thereof is compared with a threshold, the second embodiment of such a configuration as one comparator is prepared to correspond to each scan line in the area of interest while the pixel value is compared with the threshold, and the third embodiment of such a configuration as all pixel values in the area of interest are compared with the threshold in a single comparator will be described below in sequence. Description that follows will deal with a pixel of interest located at the center of an area consisting of 2N+1 scan lines with each scan line having 2N+1 dots (total number of pixels is $(2N+1)^2$)

First Embodiment

Figure 5:
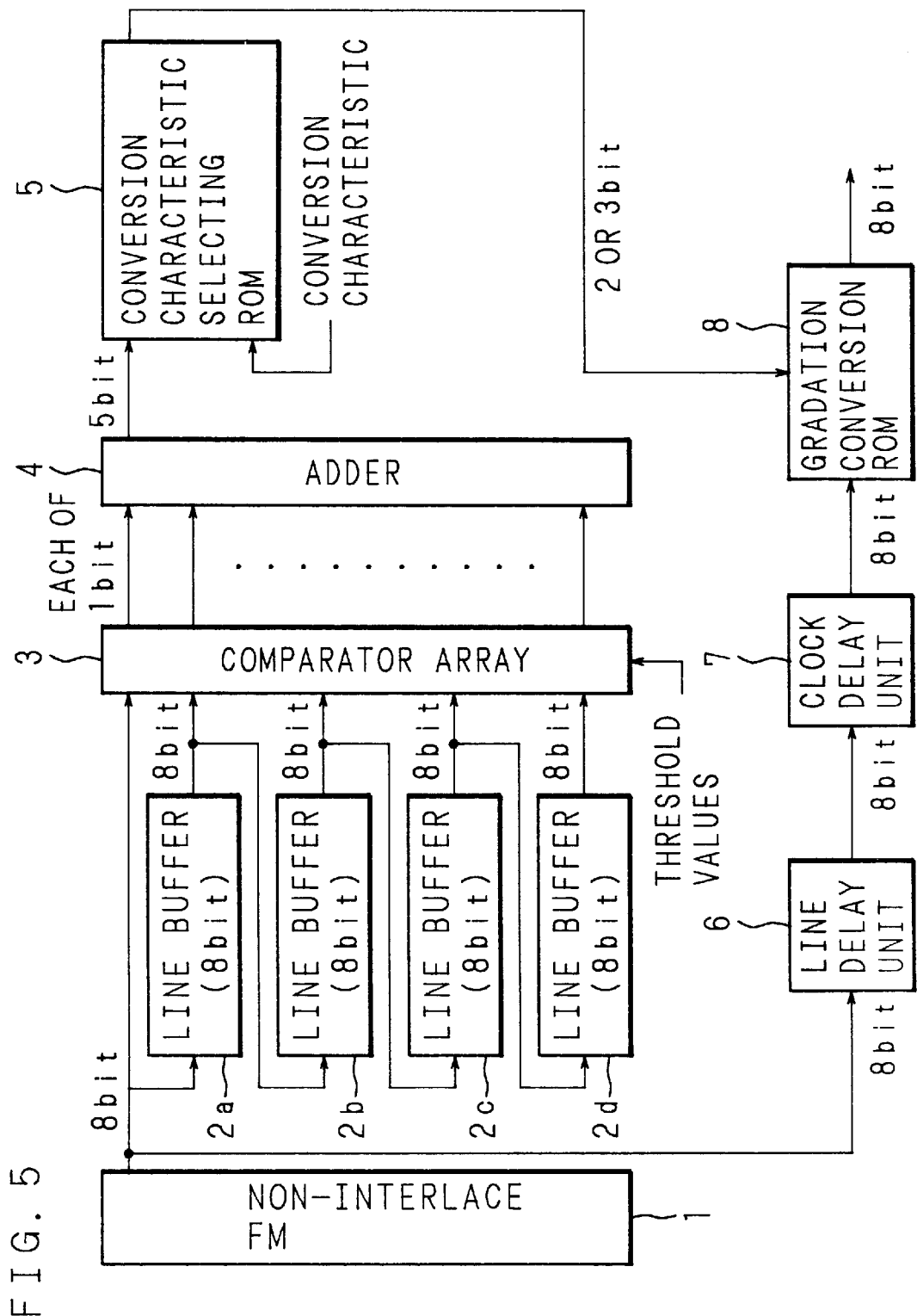
FIG. 5 is a configuration diagram of one embodiment of the image processing apparatus of the invention.

FIG. 5 is a block diagram showing the configuration of an image processing apparatus of the first embodiment. The configuration shown in FIG. 5 is a case of N=2 where the area of interest is a 5×5 matrix while the pixel of interest is located at the center (row 3, column 3) thereof. In the drawing, numeral 1 denotes a frame memory for storing non-interlace video signals (referred to as non-interlace FM hereinafter) which outputs a pixel value of 8 bits (256 gradation levels). Connected in series to the non-interlace FM 1 are 2N units of 8-bit line buffers to store the pixel values of one line. In this embodiment, because N=2, four line buffers 2a, 2b, 2c, 2d are connected. Stored in each of these line buffers 2a, 2b, 2c, 2d is the pixel value from every other line. Connected to the non-interlace FM 1 is a comparator array 3 having $(2N+1)^2$ units of comparators. In this embodiment, because N=2, the comparator array 3 has 25 comparators. The line buffers 2a, 2b, 2c, 2d are also connected to the comparator array 3.

An 8-bit threshold value is set in each comparator of t h e comparator array 3 from the outside, while each comparator compares the threshold value and an input pixel value, and outputs the result of comparison in the form of 1-bit data (1 when the input pixel value is greater than the threshold value, and 0 otherwise) to an adder 4. The adder 4 sums up the number of input data having value 1 and outputs the sum in the form of 5-bit data to a conversion characteristic selecting ROM 5. As the configuration of the adder 4, a Wallace Tree circuit widely used in multipliers may be used. The conversion characteristic selecting ROM 5 stores several kinds of conversion characteristic that are inputted from the outside. The conversion characteristic selecting ROM 5 selects one of the several kinds of conversion characteristic on the basis of the input of the sum from the adder 4, and outputs 2 to 3-bit data that represents the selected conversion characteristic to a gradation conversion ROM 8.

Connected to the non-interlace FM 1 are a line delay unit 6 that delays the pixel value by N+1 lines, 3 lines in this embodiment because N=2, and a clock delay unit 7 that delays the input pixel value by N+1 clock pulses, 3 clock pulses in this embodiment because N=2, in series in this order. In comparison to the pixel values currently outputted from the non-interlace FM 1, the result of comparison by the comparator array 3 concerns an area centered around a pixel value that is N+1 lines, 3 lines in this embodiment, before in the vertical direction and N+1 dots, 3 dots in this embodiment, before in the horizontal direction. Therefore, compensating for this delay requires the line delay unit 6 and the clock delay unit 7, and pixel value (8 bits) of the pixel of interest is outputted from the clock delay unit 7 to the gradation conversion ROM 8. The gradation conversion ROM 8 has a look-up table and determines the pixel value after conversion on the basis of the conversion characteristic data from the conversion characteristic selecting ROM 5 and the pixel value sent from the clock delay unit 7, while the pixel value after conversion is outputted to a display device not shown in the drawing. Output of the line buffer 2b may of course be used instead of the output of the line delay unit 6 shown in FIG. 5.

Figure 6:
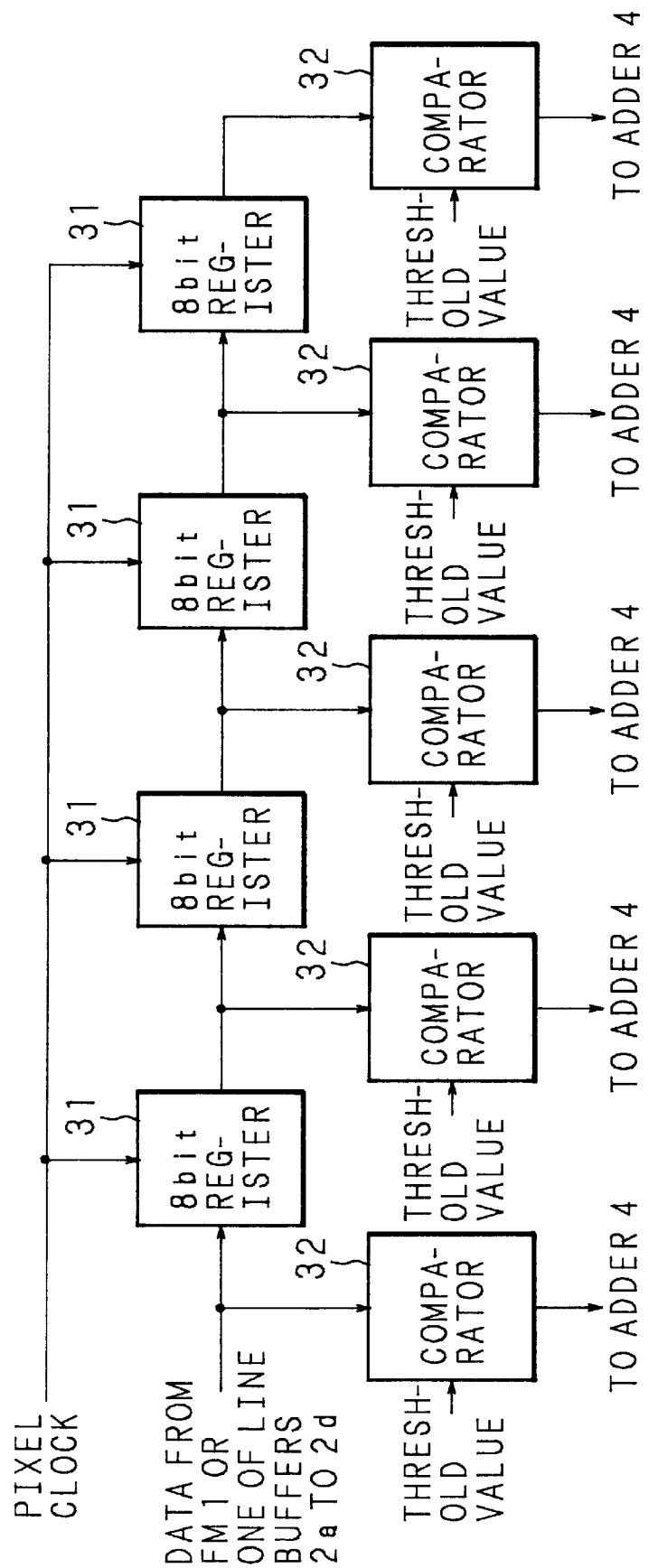
FIG. 6 is a configuration diagram of a part of a comparator array of one embodiment of the image processing apparatus of the invention.

Now the operation will be described below. The non-interlace FM 1 outputs 8-bit pixel value data, and the line buffers 2a, 2b, 2c, 2d store pixel values that are 1, 2, 3 and 4 lines before the output data from the non-interlace FM 1, respectively. 25 pixel values of the 5-row, 5-column area that are outputted from the non-interlace FM 1 and the line buffers 2a, 2b, 2c, 2d are inputted to the 25 corresponding comparators of the comparator array 3. One example of supplying data to comparators in each line of the comparator array 3 is shown in FIG. 6. There is provided with a group of registers 31 for shifting data in the array direction at every pixel clock, and respective outputs from respective registers 31 are supplied to comparators 32 corresponding to respective arrays, whereby pixel value data in the array direction can be supplied to the comparators 32 at the same time. Each comparator compares the input pixel value with the predetermined threshold value and outputs 1 when the input pixel value is greater than the threshold value and 0 when the input pixel value is equal to or smaller than the threshold value, to the adder 4. The adder 4 obtains the total number of inputs having value 1 among 25 outputs from the comparator array 3 and outputs the value of the total number to the conversion characteristic selecting ROM 5. The conversion characteristic selecting ROM 5 selects on the basis of the total number a conversion characteristic most suitable for the area where the 25 pixels exist (or for the pixel of interest) and the most suitable conversion characteristic is outputted to the gradation conversion ROM 8.

On the other hand, the pixel value of the pixel of interest is inputted from the non-interlace FM 1 via the line delay unit 6 and the clock delay unit 7 to the gradation conversion ROM 8. The pixel value of the pixel of interest that has been inputted is converted in the gradation conversion ROM 8 according to the conversion characteristic selected by the conversion characteristic selecting ROM 5, and the converted pixel value is outputted.

Second Embodiment

Figure 7:
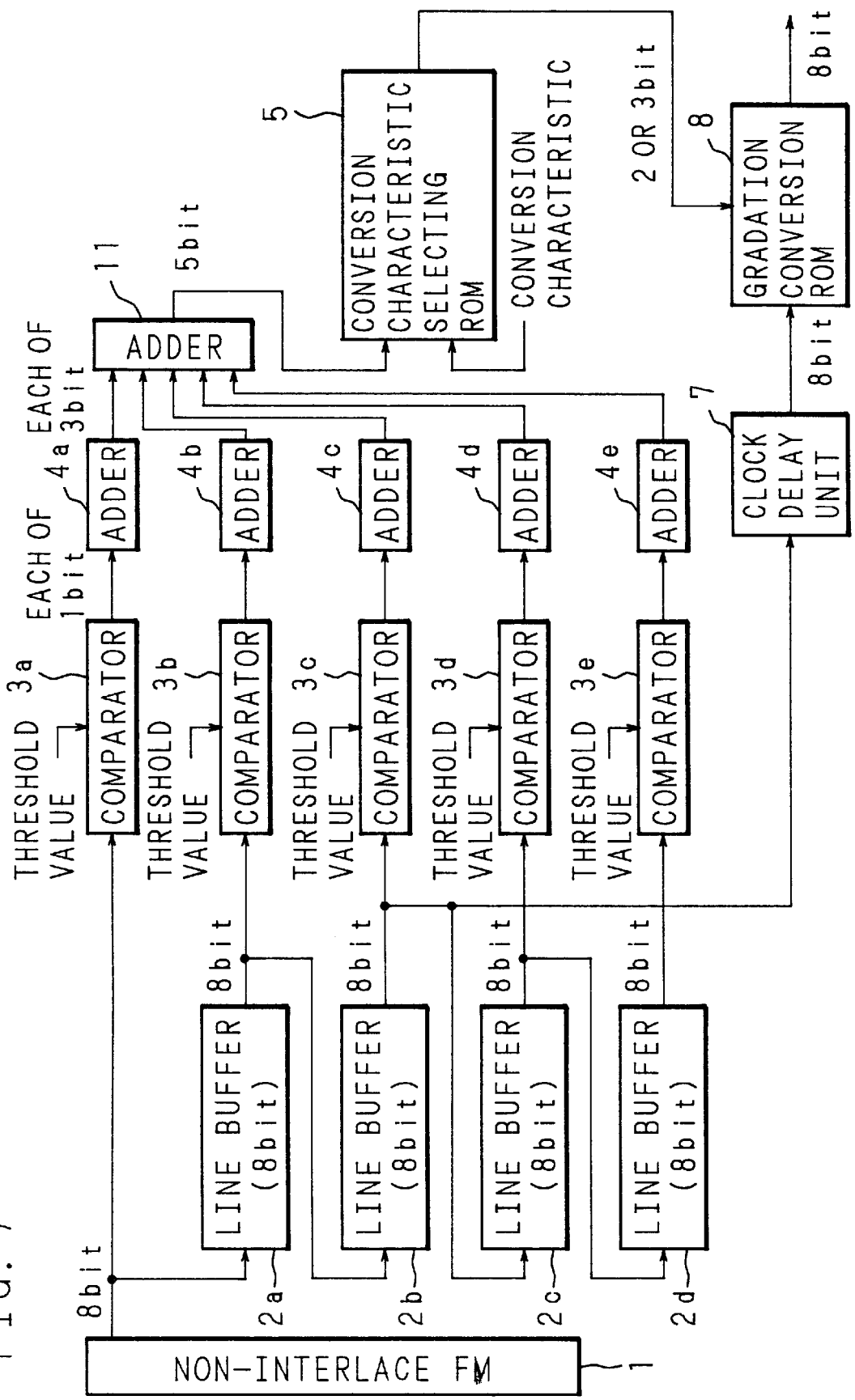
FIG. 7 is a configuration diagram of another embodiment of the image processing apparatus of the invention.

FIG. 7 is a block diagram showing the configuration of the image processing apparatus in the second embodiment. The configuration shown in FIG. 7 is the case of N=2 similarly to the first embodiment, where the area of interest is a 5×5 matrix while the pixel of interest is located at the center (row 3, column 3) thereof. Components shown in FIG. 7 that are identical to those in FIG. 5 are denoted by the same numerals and description thereof will be omitted.

Connected to the non-interlace FM 1 are four 8-bit line buffers 2a, 2b, 2c, 2d that are similar to those in the first embodiment (FIG. 5). Connected to each of the non-interlace FM 1 and the line buffers 2a, 2b, 2c, 2d is one of comparators 3a, 3b, 3c, 3d, 3e. Each of the comparators 3a, 3b, 3c, 3d, 3e compares an 8-bit pixel value that is inputted one by one with an 8-bit threshold value that is set from the outside, and outputs the result of comparison in the form of 1-bit data (1 when the input pixel value is greater than the threshold value, and 0 otherwise) successively one by one to adders 4a, 4b, 4c, 4d, 4e. This embodiment is made in such a configuration as pixel values on the same scan line are compared with the threshold value successively in a single comparator, and the same value is used also as the threshold for the pixel values located on the same scan line.

Figure 8:
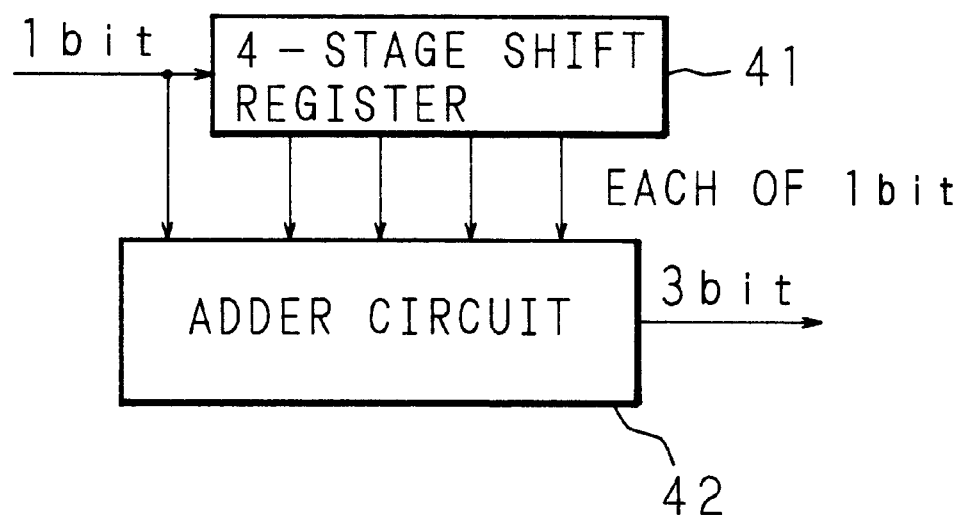
FIG. 8 is a configuration diagram of an adder in the image processing apparatus of the invention.

Each of the adders 4a, 4b, 4c, 4d, 4e has a 4-stage shift register 41 and an adder circuit 42 as shown in FIG. 8, sums up the number of input data of consecutive 5 bits having value of 1 and outputs the sum (a number from 0 to 5) in the form of 3-bit data to an adder 11. The adder 11 sums up the sums from the adders 4a, 4b, 4c, 4d, 4e and outputs the sum (a number from 0 to 25) in the form of 5-bit data to the conversion characteristic selecting ROM 5.

Connected to the line buffer 2b that stores the output from the non-interlace FM 1 while giving a delay of 2 lines to it is the clock delay unit 7 that delays the input pixel value by N+1 clock pulses, 3 clock pulses in this embodiment because N=2. In comparison to the pixel values currently outputted from the non-interlace FM 1, the result of addition obtained by the adder 11 concerns an area centered around a pixel value N+1 lines, 3 lines in this embodiment, before in the vertical direction and N+1 dots, 3 dots in this embodiment, before in the horizontal direction. Therefore, in order to compensate for this delay, the clock delay unit 7 is connected to the line buffer 2b that generates a delay of 2 lines, thereby making it possible to output the pixel value of the pixel of interest from the clock delay unit 7 to the gradation conversion ROM 8.

Now the operation will be described below. The non-interlace FM 1 outputs 8-bit pixel value, and the line buffers 2a, 2b, 2c, 2d store pixel values that are 1, 2, 3 and 4 lines before the output data of the non-interlace FM 1, respectively. Pixel values located on the same scan line are outputted one by one from the non-interlace FM 1 and the line buffers 2a, 2b, 2c, 2d and are inputted to the corresponding comparators 3a, 3b, 3c, 3d, 3e. Each of the comparators 3a, 3b, 3c, 3d, 3e compares the input pixel value with a threshold value that is specified for each scan line, and outputs value 1 when the input pixel value is greater than the threshold value and 0 when the input pixel value is equal to or smaller than the threshold value, to the corresponding adder 4a, 4b, 4c, 4d, 4e. The adders 4a, 4b, 4c, 4d, 4e obtain the total number of inputs of value 1 for each scan line and outputs the value of total number to the adder 11. The adder 11 sums up the total numbers received from the adders 4a, 4b, 4c, 4d, 4e and outputs the grand total to the conversion characteristic selecting ROM 5.

The conversion characteristic selecting ROM 5 selects on the basis of the grand total a conversion characteristic most suitable for the area where the 25 pixels exist (or for the pixel of interest) the most suitable conversion characteristic is outputted to the gradation conversion ROM 8. On the other hand, the pixel value of the pixel of interest is inputted from the non-interlace FM 1 via the line buffer 2b and the clock delay unit 7 to the gradation conversion ROM 8. The pixel value of the pixel of interest that has been inputted is converted in the gradation conversion ROM 8 according to the conversion characteristic selected by the conversion characteristic selecting ROM 5, and the converted pixel value is outputted.

Third Embodiment

Figure 9:
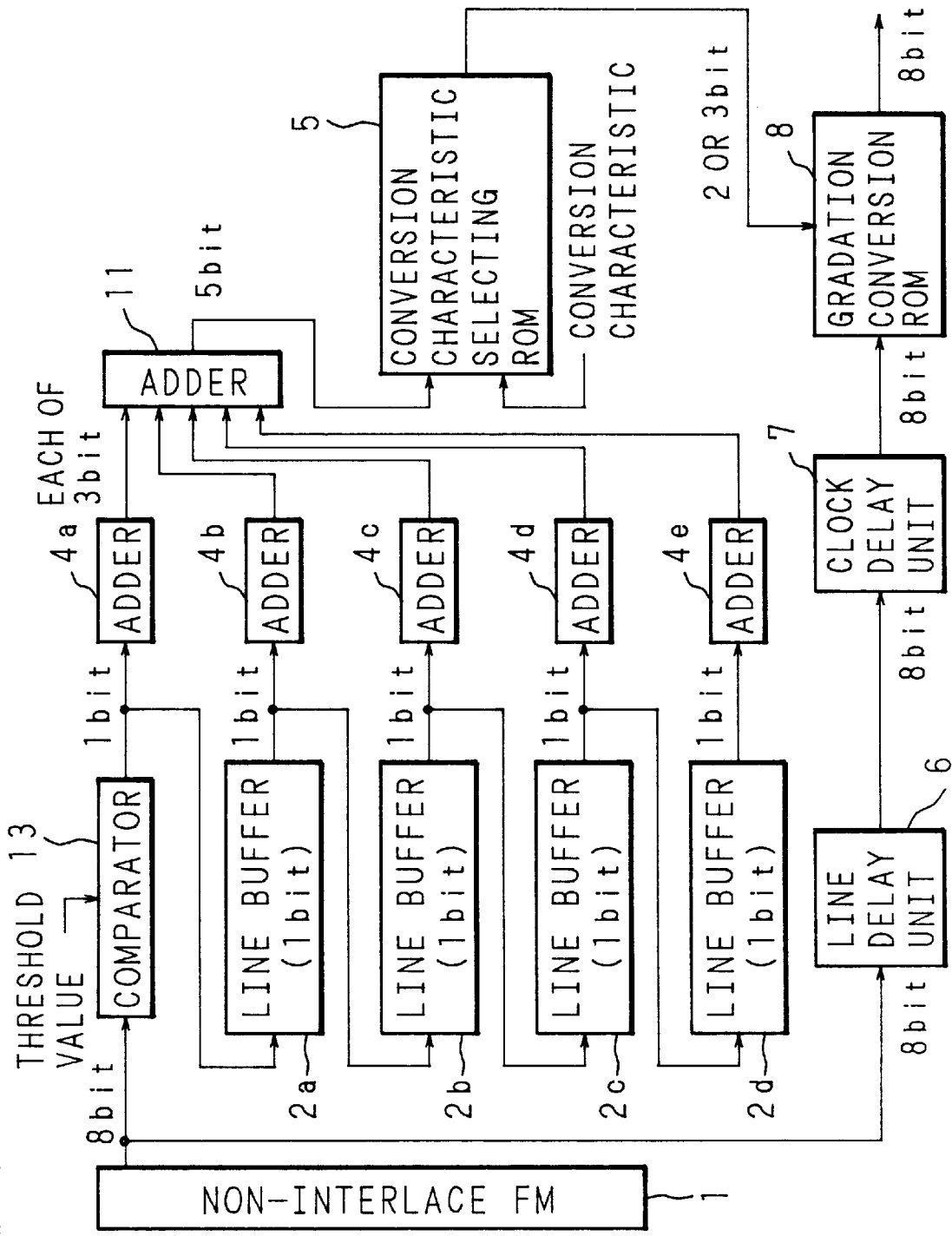
FIG. 9 is a configuration diagram of further another embodiment of the image processing apparatus of the invention.

FIG. 9 is a block diagram showing the configuration of the image processing apparatus in the third embodiment. The configuration shown in FIG. 9 is the case of N=2 similarly to the first and the second embodiments, and the area of interest is a 5×5 matrix while the pixel of interest is located at the center (row 3, column 3) thereof. Components shown in FIG. 9 that are identical to those in FIG. 5 and FIG. 7 are denoted by the same numerals and description thereof will be omitted.

Connected to the non-interlace FM 1 is a comparator 13 that compares an 8-bit pixel value being inputted one by one and an 8-bit threshold value being specified from the outside, and outputs the result of comparison in the form of 1-bit data (1 when the input pixel value is greater than the threshold value, and 0 otherwise). In this embodiment, all pixel values in the area of interest are compared successively with the threshold in the single comparator 13, and the same value is used as the threshold for all pixel values. Connected in series to the comparator 13 are 2N units, four units because N=2 in this embodiment, of 1-bit line buffers 12a, 12b, 12c, 12d to store 1-bit data representing the result of comparison by the comparator 13 while giving a delay of one line to the 1-bit data. Connected to the comparator 13 and the line buffers 12a, 12b, 12c, 12d are adders 4a, 4b, 4c, 4d, 4e similar to those in the second embodiment, one for each, respectively. Connected to the non-interlace FM 1 are the line delay unit 6, the clock delay unit 7 and the gradation conversion ROM 8 similarly to the first embodiment, so that the pixel value of the pixel of interest is inputted to the gradation conversion ROM 8.

Now the operation will be described below. The non-interlace FM 1 outputs 8-bit pixel data to the comparator 13. The comparator 13 compares the input pixel value with the predetermined threshold value and outputs value 1 when the input pixel value is greater than the threshold value and 0 when the input pixel value is equal to or smaller than the threshold value. The line buffers 12a, 12b, 12c, 12d store the results of comparison that are 1, 2, 3 and 4 lines before, respectively. Data representing the result of comparison are outputted from the comparator 13 and the line buffers 12a, 12b, 12c, 12d and are inputted to the corresponding adders 4a, 4b, 4c, 4d, 4e. Each of the adders 4a, 4b, 4c, 4d, 4e obtains the total number of inputs having value 1 for each scan line and outputs the value of total number to the adder 11. The adder 11 sums up the total numbers received from the adders 4a, 4b, 4c, 4d, 4e and outputs the grand total to the conversion characteristic selecting ROM 5.

The conversion characteristic selecting ROM 5 selects on the basis of the grand total a conversion characteristic most suitable for the area where the 25 pixels exist (or for the pixel of interest) and the most suitable conversion characteristic is outputted to the gradation conversion ROM 8. On the other hand, the pixel value of the pixel of interest is inputted from the non-interlace FM 1 via the line delay unit 6 and the clock delay unit 7 to the gradation conversion ROM 8. The pixel value of the pixel of interest that has been inputted is converted in the gradation conversion ROM 8 according to the conversion characteristic selected by the conversion characteristic selecting ROM 5, so that the converted pixel value is outputted.

In the embodiments described above, such a configuration is employed as the comparator outputs a value of 1 when the pixel value is greater than the threshold value and outputs a value of 0 when the pixel value is equal to or smaller than the threshold value, so that the most suitable conversion characteristic is selected on the basis of the total number of values 1. However, such a configuration may be selected as the comparator outputs a value of 1 when the pixel value is equal to or greater than the threshold value and outputs a value of 0 when the pixel value is smaller than the threshold value, so that the most suitable conversion characteristic is selected on the basis of the total number of values 0. Also, such a configuration may be selected as the comparator outputs a value of 1 when the pixel value is smaller than the threshold value and outputs a value of 0 when the pixel value is equal to or greater than the threshold value, so that the most suitable conversion characteristic is selected on the basis of the total number of values 1. Further, such a configuration may be employed as the comparator outputs a value of 1 when the pixel value is equal to or smaller than the threshold value and outputs a value of 0 when the pixel value is greater than the threshold value, so that the most suitable conversion characteristic is selected on the basis of the total number of values 0.

Although the comparator compares the 8-bit pixel value as it is with the 8-bit threshold value in the above embodiments, such an arrangement may also be employed as several most significant bits of the 8-bit pixel value are compared with several most significant bits of the threshold value. Such an arrangement enables a comparator of simpler configuration to carry out the comparison.

Although cases where N=2 are described in the above embodiments, these are mere examples and it needs not to say that gradation conversion can be automatically carried out with exactly the same configuration in cases where N is an arbitrary number other than 2.

Although ROM is used as a look-up table in the above embodiments, it is needless to say that a rewritable RAM, an EEPROM (Electrically Erasable Programmable Read Only Memory), a FLASH-EPROM (Flash Erasable Programmable Read Only Memory) or the like can be used.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing method for converting pixel values of an ultrasonic image, comprising:
   determining a frequency distribution based on pixel values in a spatial vicinity of a pixel of interest;
   selecting automatically a pixel intensity conversion function, from a plurality of different pixel intensity conversion functions, the pixel intensity conversion function being selected according to the determined frequency distribution, and the selected pixel intensity conversion function corresponding to a type of tissue area that corresponds to the determined frequency distribution; and
   generating a pixel value of the pixel of interest according to the selected pixel intensity conversion function.

2. An image processing method as claimed in claim 1, wherein determining the frequency distribution comprises:
   setting a threshold value for each of the pixel values in the spatial vicinity;
   determining a magnitude relationship between each of the pixel values in the spatial vicinity and the threshold value; and
   determining the frequency distribution on the basis of the magnitude relationship.

3. An image processing method as claimed in claim 2, wherein a number of pixels satisfying a particular magnitude relationship is used as the frequency distribution.

4. An image processing method as claimed in claim 1, wherein the spatial vicinity is a rectangular area on the image.

5. An image processing method as claimed in claim 1, wherein
   the displayed image is an echocardiography image in ultrasonic diagnosis.

6. An image processing method for converting pixel values of an ultrasonic image, comprising:
   determining a frequency distribution of pixel values of pixels surrounding a pixel of interest excluding the same;
   selecting automatically a pixel intensity conversion function from a plurality of different pixel intensity conversion functions on the basis of the frequency distribution that is determined, where the selected pixel intensity conversion function corresponds to a type of tissue area corresponding to the determined frequency distribution; and
   converting or generating a pixel value of the pixel of interest according to the selected conversion function.

7. An image processing apparatus for converting pixel values of an ultrasonic image, comprising:
   comparators that compare pixel values in a spatial vicinity of a pixel of interest with threshold values specified for the respective pixel values in the spatial vicinity, where the comparators output results of the comparison;
   selecting means for selecting automatically a pixel intensity conversion function from a plurality of different pixel intensity conversion functions on the basis of the results of the comparison, where the selected pixel intensity conversion function corresponds to a tissue area corresponding to the results of the comparison; and
   converting means for converting a pixel value of the pixel of interest according to the selected conversion function.

8. An image processing apparatus as claimed in claim 7, wherein the pixel values of the pixels and the threshold values are x-bit data and each of said comparators determines the magnitude relationship by comparing the most significant y bits among the x bits.

9. An image processing apparatus as claimed in claim 7, wherein said selecting means has a look-up table for determining the selected conversion function for the pixel of interest, based on the pixel value of the pixel of interest and the results of the comparison that are inputted.

10. An image processing method for converting pixel values of a single ultrasonic image representing a plurality of portions that have different reflection characteristics of ultrasonic waves, comprising:
    determining a frequency distribution of pixel values in a spatial vicinity of a pixel of interest;

selecting automatically a pixel intensity conversion function from a plurality of different pixel intensity conversion functions that are set according to the plurality of portions, where the selecting is based on the frequency distribution that is determined, and where the selected pixel intensity conversion function corresponds to a portion that corresponds to the determined frequency distribution; and converting a pixel value of the pixel of interest according to the selected pixel intensity conversion function.

11. An image processing method as claimed in claim 10, wherein the pixel intensity conversion function is a gradation function reflective of the different reflection characteristics of ultrasonic waves.

12. An image processing method, comprising:
calculating an intensity histogram of pixels in a sub-region of a single image, the pixels having an intensity according to ultrasonic reflections;
automatically identifying a tissue region of the sub-region based on the intensity histogram;
selecting an intensity-calculating function from a plurality of functions that are reflective of ultrasonic reflectivity, noise, and intensity characteristics of a plurality of tissue types, the plurality of tissue types including the type of tissue identified by the intensity histogram, where the selected intensity-calculating function corresponds to the identified tissue type; and
re-calculating the intensity of a pixel in the sub-region by applying the intensity-calculating function to a current intensity of the pixel.

13. An image processing method for converting pixel values of an ultrasonic image, comprising:
determining a frequency distribution of M pixel values of a pixel of interest and M−1 pixels spatially surrounding the same;
selecting a conversion function, from a plurality of different conversion functions, on the basis of the frequency distribution that is determined;
identifying a tissue region of the pixel of interest, and wherein said selecting a conversion function is based on the tissue region of the pixel; and
converting a pixel value of the pixel of interest according to the selected conversion function.

14. The method according to claim 13, wherein the conversion functions are gradation correction functions.

15. The method according to claim 13, further comprising pre-determining the plurality of conversion functions based on ultrasonic characteristics of tissues.

16. An apparatus for converting pixel values of an ultrasonic image, comprising:
a determining unit determining a frequency distribution based on pixel values in a spatial vicinity of a pixel of interest;
a selecting unit selecting automatically a pixel intensity conversion function, from a plurality of different pixel intensity conversion functions, the pixel intensity conversion function being selected according to the determined frequency distribution, and the selected pixel intensity conversion function corresponding to a type of tissue area that corresponds to the determined frequency distribution; and
a generating unit generating a pixel value of the pixel of interest according to the selected pixel intensity conversion function.

17. An image processing apparatus for converting pixel values of an ultrasonic image, comprising:

comparators that compare pixel values in a spatial vicinity of a pixel of interest with threshold values specified for the respective pixel values in the spatial vicinity, where the comparators output results of the comparison;
a selecting unit selecting automatically a pixel intensity conversion function from a plurality of pixel intensity conversion functions on the basis of the results of the comparison, where the selected pixel intensity conversion function corresponds to a tissue area corresponding to the results of the comparison; and
a converting unit converting a pixel value of the pixel of interest according to the selected conversion function.

18. An image processing apparatus for converting pixel values of a single ultrasonic image representing a plurality of portions that have different reflection characteristics of ultrasonic waves, comprising:
a determining unit determining a frequency distribution of pixel values in a spatial vicinity of a pixel of interest;
a selecting unit selecting automatically a pixel intensity conversion function from a plurality of different pixel intensity conversion functions that are set according to the plurality of portions, where the selecting is based on the frequency distribution that is determined, and where the selected pixel intensity conversion function corresponds to a portion that corresponds to the determined frequency distribution; and
a converting unit converting a pixel value of the pixel of interest according to the selected pixel intensity conversion function.

19. An image processing apparatus, comprising:
a calculating unit calculating an intensity histogram of pixels in a sub-region of a single image, the pixels having an intensity according to ultrasonic reflections;
an identifying unit automatically identifying a tissue region of the sub-region based on the intensity histogram;
a selecting unit selecting an intensity-calculating function from a plurality of functions that are reflective of ultrasonic reflectivity, noise, and intensity characteristics of a plurality of tissue types, the plurality of tissue types including the type of tissue identified by the intensity histogram, where the selected intensity-calculating function corresponds to the identified tissue type; and
a calculation unit re-calculating the intensity of a pixel in the sub-region by applying the intensity-calculating function to a current intensity of the pixel.

20. An image processing apparatus for converting pixel values of an ultrasonic image, comprising:
a determining unit determining a frequency distribution of M pixel values of a pixel of interest and M−1 pixels spatially surrounding the same;
a selecting unit selecting a conversion function, from a plurality of different conversion functions, on the basis of the frequency distribution that is determined;
an identifying unit identifying a tissue region of the pixel of interest, and wherein said selecting a conversion function is based on the tissue region of the pixel; and
a conversion unit converting a pixel value of the pixel of interest according to the selected conversion function.

21. A computer-readable storage for controlling a computer for processing pixel values of an ultrasonic image, the processing comprising:
determining a frequency distribution of M pixel values of a pixel of interest and M−1 pixels spatially surrounding the same;

selecting a conversion function, from a plurality of different conversion functions, on the basis of the frequency distribution that is determined;

identifying a tissue region of the pixel of interest, and wherein said selecting a conversion function is based on the tissue region of the pixel; and converting a pixel value of the pixel of interest according to the selected conversion function.

22. A computer-readable storage for controlling a computer for image processing, the processing comprising:

calculating an intensity histogram of pixels in a sub-region of a single image, the pixels having an intensity according to ultrasonic reflections;

automatically identifying a tissue region of the sub-region based on the intensity histogram;

selecting an intensity-calculating function from a plurality of functions that are reflective of ultrasonic reflectivity, noise, and intensity characteristics of a plurality of tissue types, the plurality of tissue types including the type of tissue identified by the intensity histogram, where the selected intensity-calculating function corresponds to the identified tissue type; and re-calculating the intensity of a pixel in the sub-region by applying the intensity-calculating function to a current intensity of the pixel.

* * * * *